Nov. 19, 1940.  H. V. SAFFELL  2,222,089
ROASTING RACK
Filed April 20, 1940
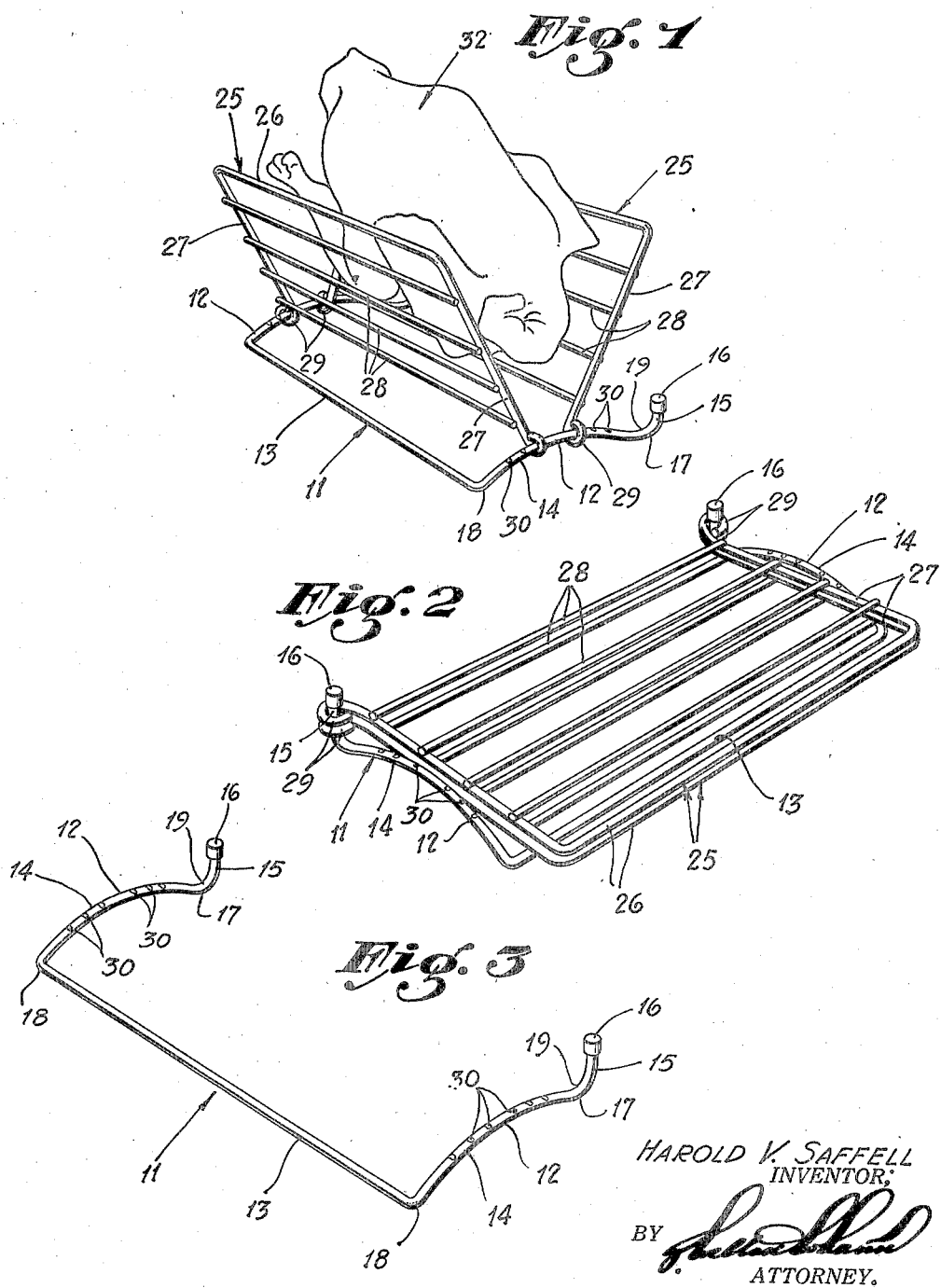
HAROLD V. SAFFELL
INVENTOR;
BY
ATTORNEY.

Patented Nov. 19, 1940

2,222,089

UNITED STATES PATENT OFFICE 2,222,089

ROASTING RACK

Harold V. Saffell, Los Angeles, Calif.

Application April 20, 1940, Serial No. 330,707

3 Claims. (Cl. 53—5)

My invention relates to roasting racks and relates more particularly to a roasting rack having adjustable supporting grills on which a fowl, roasts, hams, or other meat is supported in the roasting pan in an elevated position so that the entire fowl or roast is supported above the juice or gravy which may collect in the roasting pan.

It is an object of my invention to provide a roasting rack in which the supporting grills are readily adjustable into various supporting positions in order that different sizes of fowl, roasts, and the like may be supported thereby. In my invention the grill supports are adjustably supported by a base in such a manner that when in roasting position they extend upwardly and outwardly to form a V-shaped receiving space in which the fowl or roast is placed. By adjusting the supporting grills relative to the base the size of the V-shaped receiving space may be varied to accommodate the different sizes of fowl or roast.

It is a still further object of my invention to provide a roasting rack having the characteristics pointed out above in which the supporting grills are adjustable relative to the base into such positions as to be collapsed into a position parallel to the base and when in this position occupy but a minimum of space. Also, when in this position the roasting rack may then be used as a grill broiler, and may be used for broiling chops, steaks, and the like.

It is a still further object of my invention to provide a roasting rack in which the various parts are formed of wire, are connected together so that they are not separable, and are so related to one another as to be adjustable between collapsed or broiling position into roasting position, the parts being so constructed and arranged that they are readily movable from one of these positions to the other.

Other objects and advantages of my invention will be pointed out during the course of the following detailed description of a preferred embodiment of my invention.

Referring to the accompanying drawing:

Fig. 1 is a perspective view of my invention showing the parts in roasting position.

Fig. 2 is a perspective view showing the parts in collapsed or broiling position.

Fig. 3 is a perspective view of the base.

Referring to the drawing in detail, the numeral 11 represents a base which, as shown in Fig. 3, includes end portions 12 and a connecting section 13 which connects the end portions 12 together. The entire base 11 is preferably formed of wire, as shown. Each end portion 12 consists of an arcuate track 14 and an upright section 15 having a stop in the form of an enlargement 16. The arcuate tracks 14 are curved upwardly at their central portion and engage a supporting surface, such as a roasting pan, at points 17 and 18. Each upright section 15 is connected to one end of one of the tracks 14 by a curved section 19 so that the track 14, curved section 19, and upright section 15 each constitute a continuation of each other.

As shown in Figs. 1 and 2, my invention also provides a pair of supporting grills or grill members 25, each of which consists of a three sided rectangular frame 26 having end members 27 to which grill rods 28 are connected, such as by spot welding as illustrated. The lower ends of each of the end members 27 are provided with loops 29 which surround the end portions 12 of the base 11. It will be noted that the grill members are shorter than the distance between the end portions 12 so that when the parts are in a folded position, as shown in Fig. 2, the grill members may rest between the end portions 12. The loops 29, as will be seen from an inspection of Figs. 1 and 2, are formed so as to extend outwardly beyond the ends of the grill members.

The loops 29 are slidable into various positions along the track 14 so that the grill members may be adjustably supported in a number of different positions. The upper faces of the tracks 14 are provided with small channels 30 which act as locking means so that when the loops are positioned to engage in these channels and the grill members are swung outwardly so as to form a V, the grill members will be releasably locked in such position and will not readily slip from place. In addition to this, the gripping action produced between the loops 29 and the track 14 when the upper ends of the grill members are swung outwardly will effectively hold the grill members in a position to support the fowl or roast. It will be seen in Fig. 1 that the grill members 25 are supporting a fowl 32 in roasting position. It will further be seen that by adjusting the grill members outward or inward different sizes of fowls or roasts may be accommodated.

When it is desired to collapse the roasting rack, the two grill members are moved together and into a position in which there will be no gripping action between the loops 29 and the tracks 14. The loops are then slid along the track onto the curved section and then onto the upright section. During this movement the grill members are swung into various positions depending upon the curvature of the portion of the track, or curved section, or upright section so that there will be no gripping action between the parts and so that there will be a free sliding action. It will be seen that as the loops are swung onto the upright sections 15 it is necessary to move the grill members into a position substantially parallel to the base 11. In view of the fact that the grill members are of less length than the distance between the end portions 12 the parts when collapsed will rest as shown in Fig. 2 with the loops supported on the upright sections 15, the grill members resting between the end portions 12 and the outer ends of the grill members opposite the loops 29 being supported on the connecting section 13. When the parts are in the position shown in Fig. 2, the roasting rack may be used for broiling or may be placed in a convenient drawer or other receptacle where the roasting rack is kept when not in use.

From the foregoing description it will be clearly evident that the roasting rack of my invention may be conveniently stored in a minimum size of space, and when it is desired to use the roasting rack the parts may be readily adjusted into the desired position. It will further be seen that the parts are not separable and that one part may not be lost or improperly assembled with respect to other parts. It will further be seen that the grill members are quickly and easily adjustable into various roast supporting positions.

It is an important feature of my invention that the structure is simple in design, economical to produce, and has sufficient rigidity and strength to satisfy any roasting or broiling use to which it may be put.

In the foregoing description and in the drawing I have disclosed a preferred form of my invention. It should be understood, however, that various alterations and modifications may be made without departing from the spirit and scope of my invention and that I wish my invention to be construed in accordance with the statement of invention and the appended claims.

I claim as my invention:

1. In a roasting and broiling rack, the combination of: a base consisting of a wire shaped to provide end portions each having an arcuate track and an upright section at one end thereof, and a connecting section connecting the ends of end portions opposite said upright sections; and a pair of grill members each having a pair of loops, one loop of each grill member surrounding one of said end portions whereby said grill members may be adjustably supported on said arcuate tracks in roast-receiving position, or whereby said loops may be slid along said arcuate tracks and onto said upright sections, thus allowing said grill members to lie adjacent said base and substantially parallel thereto.

2. In a roasting and broiling rack, the combination of: a base consisting of a wire shaped to provide end portions each having an arcuate track and an upright section at one end thereof, and a connecting section connecting the ends of end portions opposite said upright sections; and a pair of grill members of less length than the distance between said end portions each having a pair of outwardly extending loops, one loop of each grill member surrounding one of said end portions whereby said grill members may be adjustably supported on said arcuate tracks in roast-receiving position, or whereby said loops may be slid along said arcuate tracks and onto said upright sections, thus allowing said grill members to lie adjacent said base between said end portions and substantially parallel thereto.

3. In a roasting and broiling rack, the combination of: a base providing end portions each having an arcuate track and an upright section at one end thereof; and a pair of grill members of less length than the distance between said end portions each having a pair of outwardly extending loops, one loop of each grill member surrounding one of said end portions whereby said grill members may be adjustably supported on said arcuate tracks in roast-receiving position, or whereby said loops may be slid along said arcuate tracks and onto said upright sections, thus allowing said grill members to lie adjacent said base between said end portions and substantially parallel thereto.

HAROLD V. SAFFELL.